Feb. 16, 1965  A. B. ROSENSTEIN  3,170,106
RESISTIVE CORE BALANCING FOR MAGNETIC REACTOR CIRCUITS
Filed July 20, 1960

INVENTOR.
ALLEN B. ROSENSTEIN
BY
ATTORNEY

United States Patent Office 3,170,106
Patented Feb. 16, 1965

3,170,106
RESISTIVE CORE BALANCING FOR MAGNETIC REACTOR CIRCUITS
Allen B. Rosenstein, 314 S. Rockingham Ave., West Los Angeles, Calif.
Filed July 20, 1960, Ser. No. 44,209
9 Claims. (Cl. 321—25)

This invention relates to magnetic amplifiers and in particular to compensating circuits therefor to minimize the effects of unbalanced reactor cores.

The ripple obtained in the output from a magnetically-regulated D.-C. power supply, as well as the dynamic performance, is effected by the degree of balance existing between the reactor cores employed in the magnetic regulator circuit. In D.-C. power supplies where the A.-C. input has a relatively high frequency, such as 2400 c.p.s., the amount of filtering required to reduce the ripple in the output to a desired value is not difficult to obtain in practical circuits. However, if the input supply frequency is relatively low, for example 400 c.p.s. or lower, the size and cost of filter components increases substantially and is often prohibitive for practical applications. In a typical polyphase reactor circuit, a plurality of individual reactors are employed having their control windings connected, usually in a series. Their power windings may be connected in a three-phase self-saturating bridge circuit with the three branch circuits contributing alternate half cycles in opposite directions to the load. By means of a silicon diode or other suitable rectifier, the power winding of each reactor is supplied with an intermittent unidirectional current. If the core of each reactor is identical in its characteristics, then the amplitude of each ripple cycle appearing across the load will be the same. If one of the cores has a different characteristic than the others, then there will be a corresponding variation in the crest values or amplitudes of the ripple cycles.

By means of the present invention, there is provided a novel feedback circuit employing resistive elements to correct any unbalance due to variations in the characteristics of the cores comprising the polyphase circuit. The resulting uniformity of the output ripple amplitude minimizes the cost and size of the smoothing filter required to obtain a given percentage of ripple content appearing across the load. The stability and linearity of the system is also improved.

It is therefore an object of this invention to provide a balancing circuit for polyphase reactor circuits.

It is another object of the invention to provide novel negative feedback compensation in magnetic reactor circuits.

It is still another object of the invention to provide means for reducing the percentage of ripple in the D.-C. output from magnetically-regulated power supplies.

These and other objects of the invention will be more clearly understood after reviewing the accompanying specification and drawings, in which.

Figure 1:
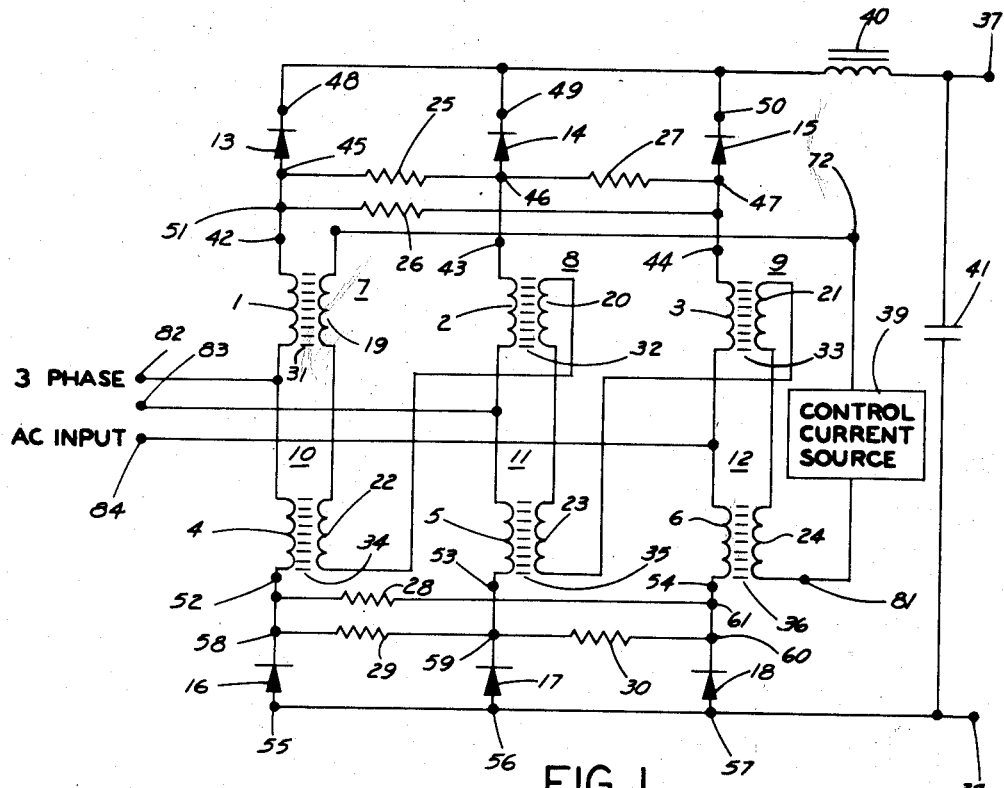
FIGURE 1 is a schematic diagram of a six-reactor polyphase A.-C. to D.-C. power supply embodying the delta-connected circuit embodiment of the present invention.
Figure 2A:
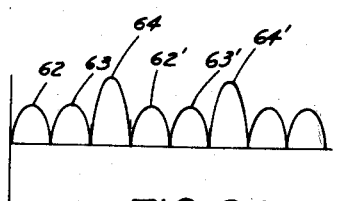
FIGURES 2A and 2B illustrate the waveforms obtained under different operating modes of the circuit of FIGURE 1.

Looking now at FIGURE 1, there is shown a magnetically-regulated power supply for converting a three-phase alternating current to direct current. The power windings 1–6 of self-saturating reactors 7–12, respectively, are connected with diodes 13–18 to provide full-wave rectification and have control windings 19–24 connected in series. The series-connected control windings 19–24 are connected via terminals 72 and 81 to a source of control current 39. Assuming that resistors 25–30 are omitted from the circuit by disconnecting them from the respective tie points, 45–47, 51, and 58–61 and that core 33 differs in its properties from cores 31–32 and 34–36, the waveform of the ripple frequency appearing across output terminals 37 and 38 might typically appear as shown in FIGURE 2A. That is, during the first cycle of supply, the first two half waves 62 and 63 of the ripple voltage, as shown in FIGURE 2A, would be of substantially equal amplitude whereas the third half wave 64 may have an amplitude exceeding that of the preceding two half waves 62 and 63 and the ensuing two half waves 62′ and 63′. The second cycle of supply terminates with half wave 64′.

Figure 2B:
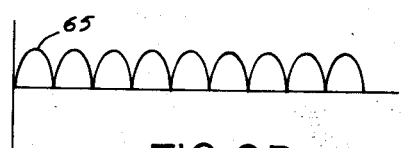

The delta connection of resistors 25–27 between the power windings 1–3 of reactors 7–9, respectively, comprise the novel feedback compensation of the invention. Similarly, resistors 28 through 30 are connected in a delta arrangement between the power winding of reactors 1 through 12, respectively. This degenerative feedback will reduce the amplitude of the errant ripple cycle resulting from core 33 being unbalanced with respect to cores 31–32 and 34–36 and will result in a waveform approximating that shown in FIGURE 2B, in which each half wave of the ripple voltage is of substantially equal amplitude, namely the amplitude of the first half wave 65.

As is well known to those skilled in the art, there is a very large number of possible circuit combinations of polyphase rectifier connections, the circuit of FIGURE 1 being but a single example. Therefore, it should be understood that the resistive core balancing circuit of the invention is also applicable to other polyphase circuits. Also, it is contemplated that the delta connection of the resistive core balancing circuit may be modified to a Y-connection. This embodiment of the invention is shown in FIGURE 3.

Figure 3:
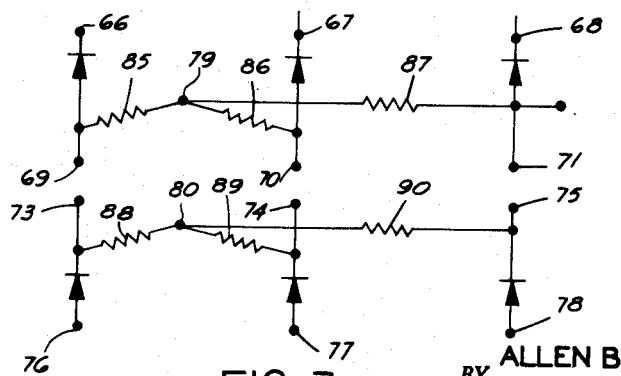
FIGURE 3 is a schematic diagram of a Y-connection compensation circuit applicable to a circuit of the type shown in FIGURE 1.

To substitute the Y-connection of FIGURE 3 for the delta connection compensating circuit of FIGURE 1, resistors 25 through 30 are replaced by resistors 85 through 90. This circuit substitution may be accomplished by deleting resistors 25 through 30 and their associated diodes 13 through 18 and substitute therefor, the circuit of FIGURE 3 by connecting terminal 66 to terminal 48, terminal 69 to terminal 42, terminal 67 to terminal 49, terminal 70 to terminal 43, terminal 68 to terminal 50, and terminal 71 to terminal 44. Similarly, terminal 73 is connected to terminal 52, terminal 76 to terminal 55, terminal 74 to terminal 53, terminal 77 to terminal 56, terminal 75 to terminal 54, and terminal 78 to terminal 57. This will result in a Y-connection of the compensating resistors in lieu of the delta connection described heretofore. In the Y-connection circuit, common tie points 79 and 80 are floating.

It will be obvious to one skilled in the art that the filter requirements necessary for smoothing the output of a circuit corrected for core unbalanced will minimize the demands imposed on filter circuit components such as series inductance 40 and shunt capacitance 41.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. In a polyphase magnetic amplifier, a plurality of saturating reactors each supplied with intermittent unidirectional current derived from a corresponding phase of a polyphase source of alternating current, a resistive network comprising a plurality of resistors equal in number to said reactors for mutually interconnecting said reactors whereby neutralizing voltages are applied from one reactor to another to maintain a substantially constant crest value of the ripple-voltage from said amplifier.

2. In a polyphase magnetic amplifier, a plurality of saturating reactors each having a power winding, a plurality of resistors equal in number to said reactors, one terminal of each of said resistors being connected to the power winding of a corresponding reactor, the alternate terminal of each of said resistors receiving a voltage from the power winding of another reactor whereby compensating voltages are provided via said resistors to provide feedback signals to compensate for any unbalance between said reactors.

3. In a polyphase magnetic amplifier, a plurality of saturating reactors connected into a self-saturating bridge circuit, means for supplying an intermittent unidirectional current to each of said reactors, and a plurality of resistors one each of which is in shunt relationship with a corresponding pair of reactors and said current supplying means thereby providing feedback circuit paths for compensating voltages effective to substantially neutralize any unbalance between said reactors.

4. In a polyphase magnetic amplifier, a source of polyphase alternating current, a plurality of saturating reactors each having a power winding, a unidirectional current conducting element in series with the power winding of an associated reactor and with a corresponding leg of said source to permit said reactors to be responsive to a given polarity of the applied current and thereby conduct in sequence, a resistor connected to each one of said reactors, said resistors being interconnected to comprise a plurality of resistive networks, each of said networks interconnecting the power windings of each of said reactors which are responsive to the same polarity to maintain a substantially constant ripple-voltage amplitude from said amplifier.

5. A polyphase regulating circuit comprising, a plurality of saturating reactors each having a power winding, a plurality of resistors equal in number to said reactors, a source of polyphase alternating current, one leg of said source being connected to one terminal of a corresponding reactor, and one terminal of each of said plurality of reactors being connected to one terminal of each of said resistors, the alternate terminal of each of said resistors being in communication with the voltage applied to the power windings of another reactor, the voltage appearing across each of said resistors serving to minimize differences in the saturating characteristics of the cores of said reactors and thereby result in a uniform amplitude of the output ripple voltage.

6. A magnetically-regulated three-phase power supply comprising, three pairs of saturating reactors each having a power winding, a source of three-phase alternating current, a plurality of unidirectional current conducting devices, each conducting device being connected in series relationship with the power winding of one of said reactors and a leg of said source of alternating current, one of the reactors of each pair being responsive to positive half waves and the other reactor of each pair being responsive to negative half waves, a first three-terminal resistive network interconnecting the power windings of the reactors responsive to positive half waves, and a second three-terminal resistive network interconnecting the power windings of the reactors responsive to negative half waves, said networks providing feedback signals to minimize the effects of core unbalance between said reactors.

7. A magnetically-regulated three-phase power supply comprising, three pairs of saturating reactors each having a power winding, a source of three-phase alternating current, a plurality of unidirectional current conducting devices, each conducting device being connected in series relationship with the power winding of one of said reactors and a leg of said source of alternating current, one of the reactors of each pair being responsive to positive half waves and the other reactor of each pair being responsive to negative half waves, a first plurality of resistors connected in a delta configuration between the power windings of the reactors responsive to positive half waves, and a second plurality of resistors connected in a delta configuration between the power windings of the reactors responsive to negative half waves, said resistors providing feed-back compensating signals to minimize the effects of core unbalance between said reactors.

8. A magnetically-regulated three-phase power supply comprising, three pairs of saturating reactors each having a power winding, a source of three-phase alternating current, a plurality of unidirectional current conducting devices, each conducting device being connected in series relationship with the power winding of one of said reactors and a leg of said source of alternating current, one of the reactors of each pair being responsive to positive half waves and the other reactor of each pair being responsive to negative half waves, a first plurality of resistors connected in a Y-configuration between the power windings of the reactors responsive to positive half waves, and a second plurality of resistors connected in a Y-configuration between the power windings of the reactors responsive to negative half waves, said resistors providing feedback compensating signals to minimize the effects of core unbalance between said reactors.

9. In a polyphase magnetic amplifier, a plurality of saturating reactors, a supply of alternating current, a rectifier element associated with each of said reactors, one half of said plurality of reactors being responsive to the positive alternations of said current supply and the remaining half of the plurality of reactors being responsive to the negative alternations of said supply, a pair of multi-terminal resistive networks, one of said networks having each of its terminals connected to a reactor of the group of reactors responsive to said positive alternations, and the other of said networks having each of its terminals connected to a reactor of the group of reactors responsive to said negative alternations, each of said networks serving to provide feedback compensating signals to minimize the effects of dissimilarity between said reactors.

References Cited in the file of this patent
UNITED STATES PATENTS

| | | |
|---|---|---|
| 1,503,213 | Stoekle | July 29, 1924 |
| 2,403,891 | Lamm | July 9, 1946 |
| 2,465,451 | Hedstrom et al. | Mar. 29, 1949 |
| 2,711,502 | Alexanderson | June 21, 1955 |
| 2,790,135 | Bennett et al. | Apr. 23, 1957 |
| 2,876,412 | Artzt | Mar. 3, 1959 |